US010623232B2

(12) United States Patent
Kazachkov et al.

(10) Patent No.: US 10,623,232 B2
(45) Date of Patent: *Apr. 14, 2020

(54) SYSTEM AND METHOD FOR DETERMINING AND FORMING A LIST OF UPDATE AGENTS

(71) Applicant: AO Kaspersky Lab, Moscow (RU)

(72) Inventors: Andrey V. Kazachkov, Moscow (RU); Evgeny S. Zakharov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 124 days.

This patent is subject to a terminal disclaimer.

(21) Appl. No.: 15/419,111

(22) Filed: Jan. 30, 2017

(65) Prior Publication Data

US 2017/0373923 A1 Dec. 28, 2017

(30) Foreign Application Priority Data

Jun. 24, 2016 (RU) .................................. 2016125281

(51) Int. Cl.
*G06F 15/16* (2006.01)
*H04L 12/24* (2006.01)
*H04L 29/06* (2006.01)

(52) U.S. Cl.
CPC ............ *H04L 41/046* (2013.01); *H04L 63/10* (2013.01); *H04L 63/14* (2013.01)

(58) Field of Classification Search
None
See application file for complete search history.

(56) References Cited

U.S. PATENT DOCUMENTS

| 6,771,287 | B1* | 8/2004 | Walker ................... H04L 41/22 709/224 |
| 7,610,403 | B2* | 10/2009 | Jinzaki ............. H04L 29/12066 709/227 |
| 8,447,801 | B1* | 5/2013 | Roche ................. G06F 16/1834 709/201 |
| 8,838,635 | B2* | 9/2014 | Mulligan .................. G06F 8/61 707/759 |
| 9,135,261 | B2* | 9/2015 | Maunder ............... G06F 16/134 |
| 2004/0261071 | A1* | 12/2004 | Chuang ..................... G06F 8/65 717/170 |
| 2005/0080846 | A1* | 4/2005 | McCleskey ............. G06F 21/10 709/202 |
| 2010/0191839 | A1* | 7/2010 | Gandhewar ....... H04L 29/12028 709/220 |

(Continued)

*Primary Examiner* — Dhairya A Patel
(74) *Attorney, Agent, or Firm* — Arent Fox LLP; Michael Fainberg (57) ABSTRACT

Disclosed are system and method for determining and forming a list of update agents for a plurality of network terminal nodes connecting with at least one server in a network. One exemplary method comprises: receiving, by at least one network terminal node of the plurality of network terminal nodes, at least one unique identifier assigned by the server to the at least one network terminal node; broadcasting in the network the at least one unique identifier by the at least one network terminal node; collecting data relating to the at least one network terminal node and other network terminal nodes broadcasting in a same broadcasting domain of the network; and transmitting the data to the server for determining and forming a list of update agents for the same broadcasting domain of the network.

18 Claims, 4 Drawing Sheets (56) References Cited

U.S. PATENT DOCUMENTS

| | | | | |
|---|---|---|---|---|
| 2011/0138469 A1* | 6/2011 | Ye | ............... | G06F 21/577 |
| | | | | 726/25 |
| 2012/0254661 A1* | 10/2012 | Tsongas | ............ | G06F 11/3013 |
| | | | | 714/32 |
| 2014/0040440 A1* | 2/2014 | Christopher | ........ | H04L 61/6022 |
| | | | | 709/220 |
| 2014/0233738 A1* | 8/2014 | Chunduri | ............ | H04L 63/0428 |
| | | | | 380/277 |
| 2014/0241271 A1* | 8/2014 | Jung | ................ | H04W 8/26 |
| | | | | 370/329 |
| 2016/0330258 A1* | 11/2016 | Sandhu | .................. | H04L 67/16 |

* cited by examiner

SYSTEM AND METHOD FOR DETERMINING AND FORMING A LIST OF UPDATE AGENTS

CROSS-REFERENCE TO RELATED APPLICATIONS

This application claims benefit of priority under 35 U.S.C. 119(a)-(d) to a Russian Patent Application No. 2016125281 filed Jun. 24, 2016, which is incorporated by reference herein

FIELD OF TECHNOLOGY

The present application related to the field of software and, more particularly to system and method for determining and forming a list of update agents in a network.

BACKGROUND

For the time being, certain software installed on computers has updating mechanisms. The operating systems and different applications have means in their makeup (such as Windows Update) making it possible to consult remote computers (such as servers on the Internet) to check for the presence of new versions of their components. After discovering new versions, the aforesaid means download the necessary files and perform the installation of the new versions.

It should be noted that the operating systems and applications at present may install not only updated versions of individual components, but also may perform an overall update. For example, the switch from Windows 8 to Windows 10 is possible with the help of the Windows update means.

Various external applications may also have updating means. Some applications may be updated with the use of patches (files containing only new versions of components). Other applications (usually not very large in size) may download distribution kits with an entire updated version. Certain applications, besides executable components, may also update other data for correct operation. Thus, for example, antivirus applications may update separate modules, perform an overall update when switching to a new version, and update the data libraries needed to detect malicious software several times a day.

It should be noted that, along with the foregoing, networks of various organizations may be constantly growing, and have a multitude of possible topologies and are often connected to a global network (having access to the Internet). A situation is also possible where the organization has several local offices, each office having its own local area network organized, and the offices are linked by means of the Internet. It is also desirable to update the software of each computer making up the network of the organization, at least in order to reduce the risks of loss of confidential data by hackers utilizing vulnerabilities of old software versions.

The multitude of possible network topologies and the need to update software often creates inconvenience and additional financial losses for organizations. Thus, if the software of each computer of a local area network is being updated with the use of a remote server, this increases by several fold, and often even by an order of magnitude (if there are 100 or more computers in the network) the traffic required and, accordingly, the financial expenses to pay for this type of update. Furthermore, the speed of obtaining data (in the given case, updates) from a remote server is usually much lower than the speed of obtaining data from other computers within the local area network.

The described problem may be solved in part by updating servers situated within the local area network. Such servers in some cases may be able to reduce the volume of required traffic and increase the speed of distribution of software updates throughout the local area network.

It should be noted that the computers of a network are often divided up into administration groups by the system administrator. Such a division may not allow for the network topology (for example, the group of managers, the testing group). As a result, if an update server has been assigned to an administration group, a computer from the given group may be updated from the assigned update server, but it may not be in the same local area network with the server, which will also result in traffic expenditure.

For a more effective distribution of traffic within networks with complex topology, besides a local update server, it may be desirable to form lists of other computers (update agents) which may distribute updates within a broadcasting domain (network segment).

SUMMARY

Disclosed are systems and method for forming a list of update agents for a plurality of network terminal nodes connecting with at least one server in a network. One exemplary method comprises: receiving, by a processor of at least one network terminal node of the plurality of network terminal nodes, at least one unique identifier assigned by the at least one server to the at least one network terminal node; broadcasting in the network the at least one unique identifier by the at least one network terminal node; collecting data relating to the at least one network terminal node and other network terminal nodes broadcasting in a same broadcasting domain of the network; and transmitting the data to the at least one server for determining and forming a list of update agents for the same broadcasting domain of the network.

In one exemplary aspect, the method further comprises receiving, by the processor of the at least one network terminal node, a period of broadcasting assigned by the at least one server to the at least one network terminal node.

In another exemplary aspect, collecting the data relating to the at least one network terminal node and other network terminal nodes broadcasting in the same broadcasting domain of the network may comprise receiving a set of identifiers broadcast by the other network terminal nodes in the same broadcasting domain of the network.

In yet another exemplary aspect, the data relating to the at least one network terminal node comprise information relating to at least one of: a speed of a central processor of the at least one network terminal node; an amount of free space on hard drives of the at least one network terminal node; a domain suffix of a name of the at least one network terminal node; a presence of vulnerabilities in software installed on the at least one network terminal node; a time period of uninterrupted operation of the at least one network terminal node; an account of a user using the at least one network terminal node; or a presence of a built-in battery in the at least one network terminal node.

In one exemplary aspect, a network terminal node in a network, comprising: at least one processor coupled to memory, the at least one processor being configured for: receiving at least one unique identifier assigned by the at least one server to the network terminal node which is one of a plurality of network terminal nodes connecting with the at least one server in the network; broadcasting in the network the at least one unique identifier; collecting data relating to the network terminal node and other network terminal nodes broadcasting in a same broadcasting domain of the network; and transmitting the data to the at least one server for determining and forming a list of update agents for the same broadcasting domain of the network.

In yet another exemplary aspect, a non-transitory computer readable medium storing thereon computer executable instructions for determining and forming a list of update agents for a plurality of network terminal nodes connecting with at least one server in a network, including instructions for: receiving, by a processor of at least one network terminal node of the plurality of network terminal nodes, at least one unique identifier assigned by the at least one server to the at least one network terminal node; broadcasting in the network the at least one unique identifier by the at least one network terminal node; collecting data relating to the at least one network terminal node and other network terminal nodes broadcasting in a same broadcasting domain of the network; and transmitting the data to the at least one server for determining and forming a list of update agents for the same broadcasting domain of the network.

Moreover, an exemplary computer-implemented method for determining and forming a list of update agents for a plurality of network terminal nodes connecting with at least one server in a network, the method comprising: assigning, by a processor of the at least one server, at least one unique identifier to be broadcast by each of the plurality of network terminal nodes connecting with the at least one server in the network; in response to receiving data relating to each of the plurality of network terminal nodes, determining and forming a table of records for one or more broadcasting domains of the network; and determining and forming a list of identifiers of update agents for each of the one or more broadcasting domains of the network.

In one exemplary aspect, the method further comprises: determining, for each of the plurality of network terminal nodes, a period of broadcasting of the at least one unique identifier in the network; transmitting the period of broadcasting to each of the plurality of network terminal nodes; and transmitting the list of identifiers of update agents to each of the one or more broadcasting domains of the network.

In another exemplary aspect, the update agents comprise one or more network terminal nodes of each broadcasting domain whose identifier is contained in at least one record of the table, and which is designated for distribution of updates to other network terminal nodes within a same broadcasting domain.

In addition, in in exemplary aspects, a server in a network, comprising: at least one processor coupled to memory, the at least one processor being configured for: assigning at least one unique identifier to be broadcast by each of a plurality of network terminal nodes connecting with the server in the network; in response to receiving data relating to each of the plurality of network terminal nodes, determining and forming a table of records for one or more broadcasting domains of the network; and determining and forming a list of identifiers of update agents for each of the one or more broadcasting domains of the network.

Furthermore, in exemplary aspects, a non-transitory computer readable medium storing thereon computer executable instructions for determining and forming a list of update agents for a plurality of network terminal nodes connecting with at least one server in a network, including instructions for: assigning, by a processor of the at least one server, at least one unique identifier to be broadcast by each of the plurality of network terminal nodes connecting with the at least one server in the network; in response to receiving data relating to each of the plurality of network terminal nodes, determining and forming a table of records for one or more broadcasting domains of the network; and determining and forming a list of identifiers of update agents for each of the one or more broadcasting domains of the network.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects of the invention are described herein in the context of a system, method and computer program product for determining and forming a list of update agents in a network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
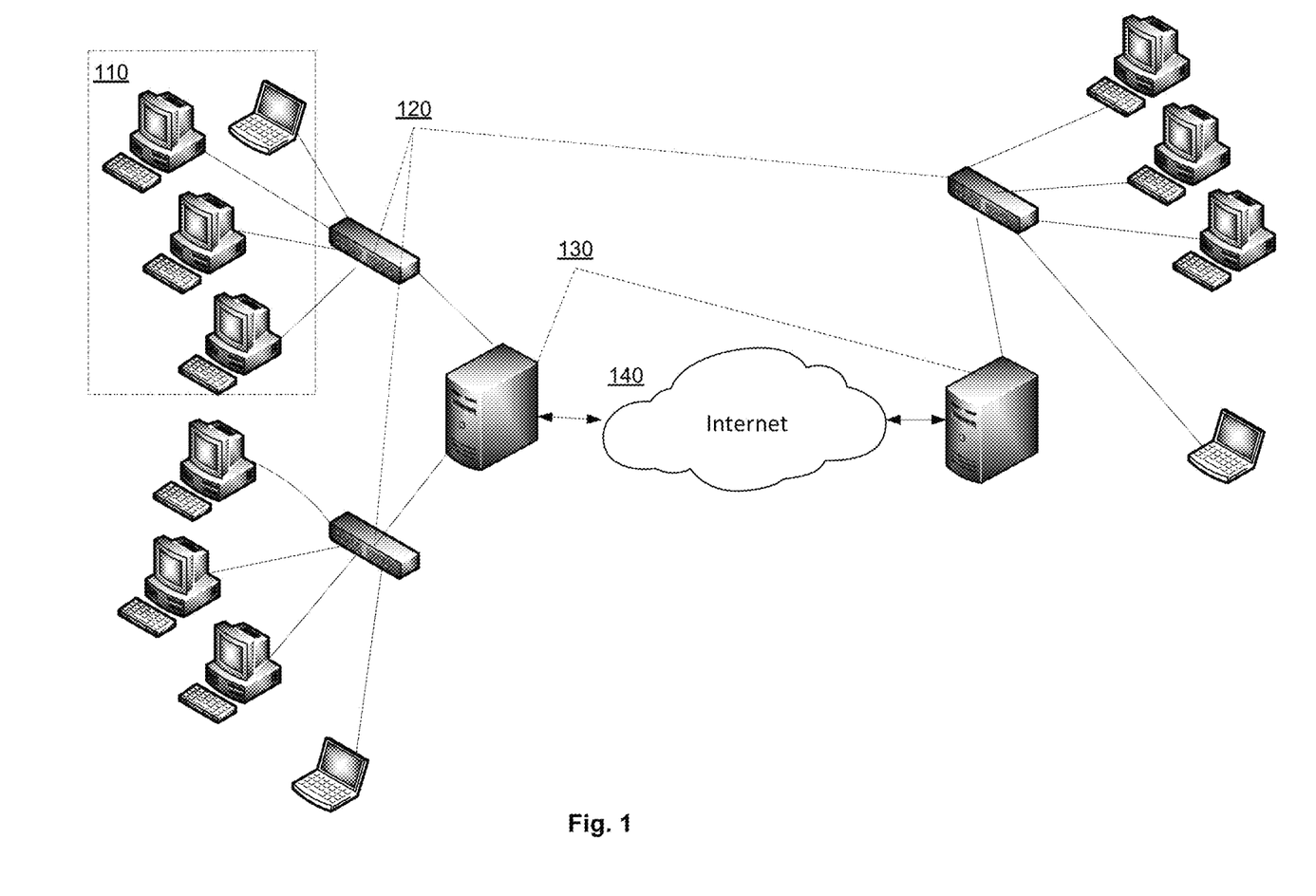
FIG. 1 shows an example of the topology of a local area network of an organization according to aspects of the present invention.

FIG. 1 shows an example topology of a local area network of an organization according to aspects of the invention. In one exemplary aspect, a network may contain terminal network nodes 110, which may include various computing devices (servers, stationary computers, notebooks, mobile telephones, and other communication devices), linked together by means of switching devices 120 (switches, access points, routers). Each network and subnetwork (part of the network) may have its own topology. In one example case, a network topology may be a graph configuration, the vertices of which correspond to the terminal network nodes 110 and switching devices 120, while the links between the vertices correspond to the edges. The networks and subnetworks in the example case may be linked by means of gateways 130 and the Internet 140. In one exemplary aspect, the gateways 130 may be separate computers, or alternatively separate devices, such as routers.

It should be noted that, in the context of the present invention, the terms terminal network nodes and terminal nodes may be exchangeable.

Via the Internet 140, the terminal network nodes 110 of different local area networks of an organization may exchange data, while the local area networks may be situated either in different parts of the same city or in different regions of the same country or also in different countries.

When receiving updates (updating of software components) by the terminal network nodes 110, the traffic between the terminal nodes and the servers distributing the updates increases in linear manner, at least because each terminal network node 110 (for example, the computers of a certain subnetwork of the organization have a typical set of installed operating systems and programs) may receive the same updates, which may often be kept on servers in the Internet 140.

Figure 2:
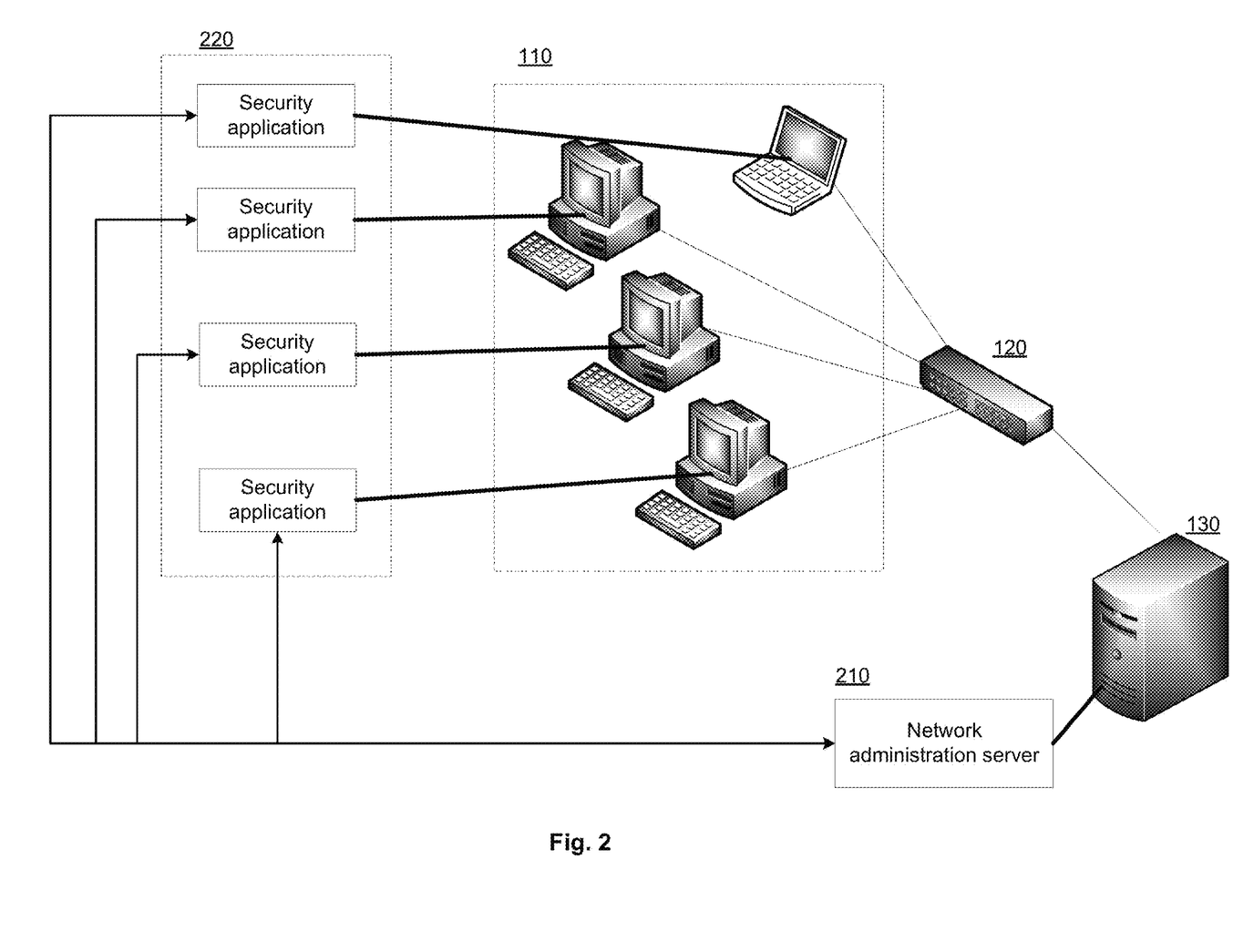
FIG. 2 shows a diagram of an exemplary system for determining and forming a list of update agents in a network according to aspects of the present invention.

FIG. 2 shows a diagram of an exemplary system for determining and forming a list of update agents in a network according to aspects of the present invention. Network administration servers 210 may often be part of the software ensuring the security of the computers making up the network of an organization (for example, making up the antivirus software for corporate users, such as Kaspersky Endpoint Security). A network administration server 210 may be a component of the corporate software, generally running on a network server of the organization, which component may exchange data with security applications 220 installed at the terminal network nodes 110. The data transmitted by the network administration server 210 to the security applications 220 may contain, for example, the network security policies (specifically, when to scan the network terminal nodes 110 for the presence of malicious software, when to perform the updating, and others). The data of the security applications 220 transmitted to the network administration server 210 may contain, for example, data as to the detection of malicious software on the network terminal node 110, as well as reports on the running of the security application 220.

It should be noted that the data which the network administration server 210 exchanges with the security applications 220 may not be limited to the aforementioned examples.

In accordance with one exemplary aspect, the network administration server 210 may assign a unique identifier to each network terminal node 110 (for example, a computer of the network). It should be noted that in the general case the network administration server 210 and the security application 220 may be linked together and send data to each other using, e.g., transmission control protocol (TCP). The identifier in the general case may include a whole number. All the network terminal nodes 110 may periodically perform a broadcasting via, e.g., the security application 220. The broadcasting in the general case may comprise transmitting a broadcast message to the network which may be done by any method known from the prior art (such as the use of a packet transmission by means of the user datagram protocol (UDP), in which each packet transmitted may be designed to be received by all network participants). In one exemplary aspect, the broadcast message may be received only by those network terminal nodes 110 located in the same broadcasting domain. A broadcasting domain may include a segment (subnetwork) of a particular network (such as wide-area or local-area) which may bring together the network terminal nodes 110 between which there is no gateway 130. In one exemplary aspect, the broadcasting may be done by means of the UDP and it may contain the aforementioned identifier, assigned by the network administration server 210. Alternatively, the broadcasting may be done periodically. The period of broadcasting may be assigned by the network administration server 210. For example, such period may have an unchanging value (such as 2 hours), or may be calculated by the network administration server 210 in dependence on the size of the network. Moreover, the period of broadcasting may be increased by 10 minutes for every 10 network terminal nodes 110. Thus, if the network has 100 network terminal nodes 110, the broadcasting may be performed by each network terminal node 110 once every 1 hour and 40 minutes. The total number of network terminal nodes 110 in the network may be known to the network administration server 210, and once calculated, the period of broadcasting may be transmitted to the security applications 220.

The security application 220 may periodically dispatch to the network administration server 210 a set of identifiers of the other network terminal nodes 110 received as a result of the broadcasting. In one aspect, the number of identifiers in the mentioned set may be limited by a threshold value (such as 10 identifiers), for traffic economy. The identifiers of the other network terminal nodes 110 obtained as a result of the broadcasting may be sorted in an ascending or a descending order. The period of dispatching may be determined by the network administration server 210 (it may be equal to the period of broadcasting or calculated by the network administration server 210 based at least on the number of network terminal nodes 110).

Moreover, the security application 220 may periodically collect data about the network terminal node 110 containing criteria which may characterize the mentioned network terminal node 110. A criterion may include a characteristic of the network terminal node 110 reflecting at least its operating speed, its location in the network, and the purpose of its use.

Criteria which may characterize the network terminal node 110 may include (but are not limited to):
  the speed of the central processor of the network terminal node 110;
  the amount of free space on the hard drives of the network terminal node 110;
  the domain suffix of the name of the network terminal node 110;
  the presence of vulnerabilities in the software installed on the network terminal node 110;
  the time of uninterrupted operation (uptime) of the network terminal node 110;
  the account of the user using the network terminal node 110; or
  the presence of a built-in battery in the network terminal node 110.

After collecting the data, the security application 220 may dispatch the data containing the criteria characterizing the network terminal node 110 to the network administration server 210. In one exemplary aspect, the security application 220 may dispatch the criteria along with the set of identifiers of the other network terminal nodes 110.

The network administration server 210 may form a table of records on the broadcasting domains of the network based at least on the data received from each security application 220 containing the set of identifiers of the other network terminal nodes 110. The broadcasting domain in the context of the present invention may contain three or more network terminal nodes 110. Within a broadcasting domain, the network terminal nodes 110 may be visible to each other, wherein a first and a second network terminal node 110 may be considered to be visible to each other if the network administration server 210 may have obtained the identifier of the third network terminal node 110 from the first network terminal node 110 and the identifier of the third network terminal node 110 from the second network terminal node 110. The record on each broadcasting domain in the table may contain the identifiers of all the network terminal nodes 110 of the network segment that may be visible to each other.

Thus, if a computer with identifier #1 has sent to the server the identifiers #12, #11, #10 after the broadcasting (for example, the identifiers have been sorted in descending order, the number may be limited to three identifiers), while a computer with identifier #3 has sent to the server the identifiers #12, #11, #10, then at least the computers #1, #3, #10, #11, #12 may be part of the broadcasting domain.

Moreover, the network administration server 210 on the basis of the data obtained from the security applications 220, containing criteria which may characterize the terminal nodes 110 may determine and form a list of update agents for each broadcasting domain. An update agent may include one of the network terminal nodes 110 of the broadcasting domain whose identifier may be contained in a record of the table so formed, and which may be designated for distribution (transmission) of updates to other network terminal nodes 110 within the broadcasting domain.

The criteria may be taken into consideration by the network administration server 210 when forming the list according to various rules. Thus, for example, a computer with a processor of insufficient performance may not be designated as an update agent. In another exemplary aspect, a computer having inadequate free space on its hard drive (such as less than 50 Gb) may not be designated as an update agent. It may also be undesirable to designate as an update agent a computer which may be, for example, a mail server (which may be determined by the domain suffix), one which may be vulnerable (for example, it may have a large number of registered incidents of being infected by malicious applications), one which may be constantly turned off (on average, on less than three hours a day), or one which may be the working computer of certain persons in the organization (such as the accountant, the network administrator or the managing director). It may also often be incorrect to designate as an update agent a notebook (determined by the presence of a built-in battery), which may be a mobile network terminal node 110 whose computing resources often should not be overloaded.

In accordance with one exemplary aspect, the update may include a file containing the new version of a component of the operating system. In another exemplary aspect, the update may include a file containing the new version of a component of the security application. In yet another exemplary aspect, the update may include a file containing the new version of a component of an application installed on the network terminal node 110.

It should be noted that in accordance with one exemplary aspect of the present invention, the number of update agents in the list formed by the network administration server 210 may be calculated based at least on the number of terminal nodes located in the given broadcasting domain. In another exemplary aspect, the number of update agents may be limited by a threshold value (for example, the minimum number of update agents in the broadcasting domain may be 6).

In accordance with yet another exemplary aspect, the list of update agents may be determined and formed periodically. In the event that an update agent "drops out" from the network (has stopped responding to requests, for example, as a result of being turned off), or if an update agent no longer complies with the aforementioned criteria, the network administration server 210 may determine and form a new list, wherein the aforementioned update agent may become an ordinary network terminal node 110, that is, no longer performs the functions of distributing updates, and in its place a different update agent may be designated by the network administration server 210.

The network administration server 210 may transmit to the security applications 220 the list of identifiers of the update agents which may be located in the same broadcasting domain as the one in which the network terminal node 110 with the installed security application 220 may be located.

Figure 3:
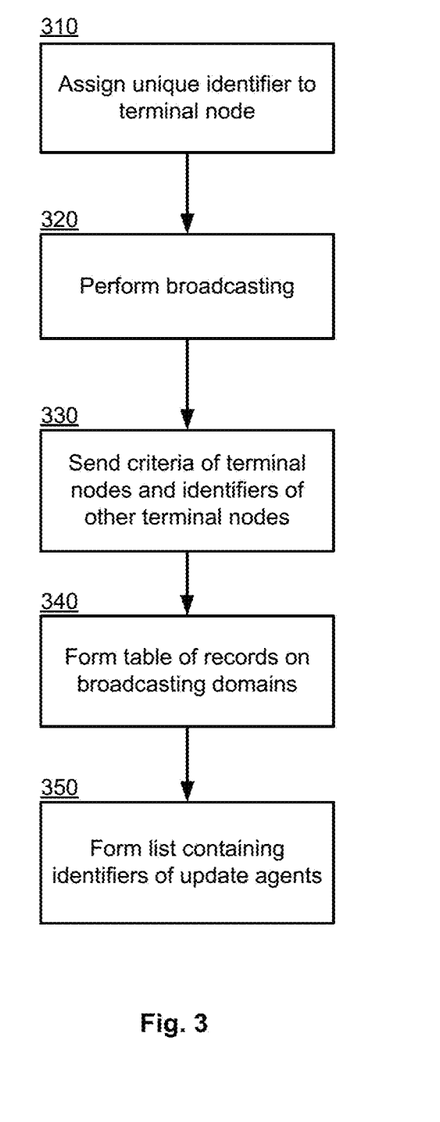
FIG. 3 shows a flow chart of an exemplary method for determining and forming a list of update agents according to aspects of the present invention.

FIG. 3 shows a flow chart of an exemplary method for determining and forming a list of update agents according to aspects of the present invention.

In step 310, a unique identifier may be assigned by the network administration server 210 to each network terminal node 110. In one aspect, the remote administration server may be a component of the corporate antivirus software.

In step 320, the security application 220 installed on the network terminal node 110 may perform broadcasting, where the broadcast may contain the aforementioned identifier. In an aspect, the broadcasting may be done using, e.g., the UDP.

In step 330, the security application 220 installed on the network terminal node 110 may dispatch data to the network administration server 210, containing criteria which may characterize the aforementioned terminal node 110 and the set of identifiers of other network terminal nodes 110 received as a result of the broadcasting, wherein the number of identifiers in the mentioned set may be limited by a threshold value. In one aspect, the security application 220 may dispatch the data to the network administration server 210 using, e.g., the TCP.

Criteria which may characterize the network terminal node 110 may include at least one of the following:
- the speed of the central processor of the network terminal node 110;
- the amount of free space on the hard drives of the network terminal node 110;
- the domain suffix of the name of the network terminal node 110;
- the vulnerability of the software installed on the network terminal node 110;
- the time of uninterrupted operation of the network terminal node 110;
- the account of the user using the network terminal node 110;
- the presence of a built-in battery in the network terminal node 110.

In one exemplary aspect, the identifiers of other network terminal nodes 110 obtained as a result of the broadcasting may be sorted in an ascending or a descending order.

In step 340, the network administration server 210 may determine and form a table of records on the broadcasting domains of the network based on the data obtained from each security application 220, containing the set of identifiers of the other network terminal nodes 110, a broadcasting domain being a network segment containing at least three terminal nodes 110, and the record on each broadcasting domain in the table containing the identifiers of the network terminal nodes 110 of the network segment that may be visible to each other. In accordance with one exemplary aspect of the invention, two network terminal nodes 110 may be considered to be visible to each other if the network administration server 210 has received the identifier of a third network terminal node 110 from the first network terminal node 110 and the identifier of the third network terminal node 110 from the second network terminal node 110.

In step 350, the network administration server 210 based at least on the obtained data containing criteria characterizing the network terminal nodes 110 may determine and form a list containing the identifiers of the update agents, where an update agent may be one or more network terminal nodes 110 of each broadcasting domain whose identifier may be contained in a record of the table so formed, and which may be designated for distribution of updates to the other network terminal nodes 110 within the broadcasting domain. In one exemplary aspect, the update may be a file containing a new version of a component of the operating system. In another exemplary aspect, the update may include a file containing the new version of a component of the security application. In yet another aspect, the update may include a file containing the new version of a component of an application installed on the network terminal node 110.

The network administration server 210 may transmit to the security applications 220 the list of identifiers of the update agents which may be located in the same broadcasting domain in which the network terminal node 110 with the installed security application 220 may be located.

Figure 4:
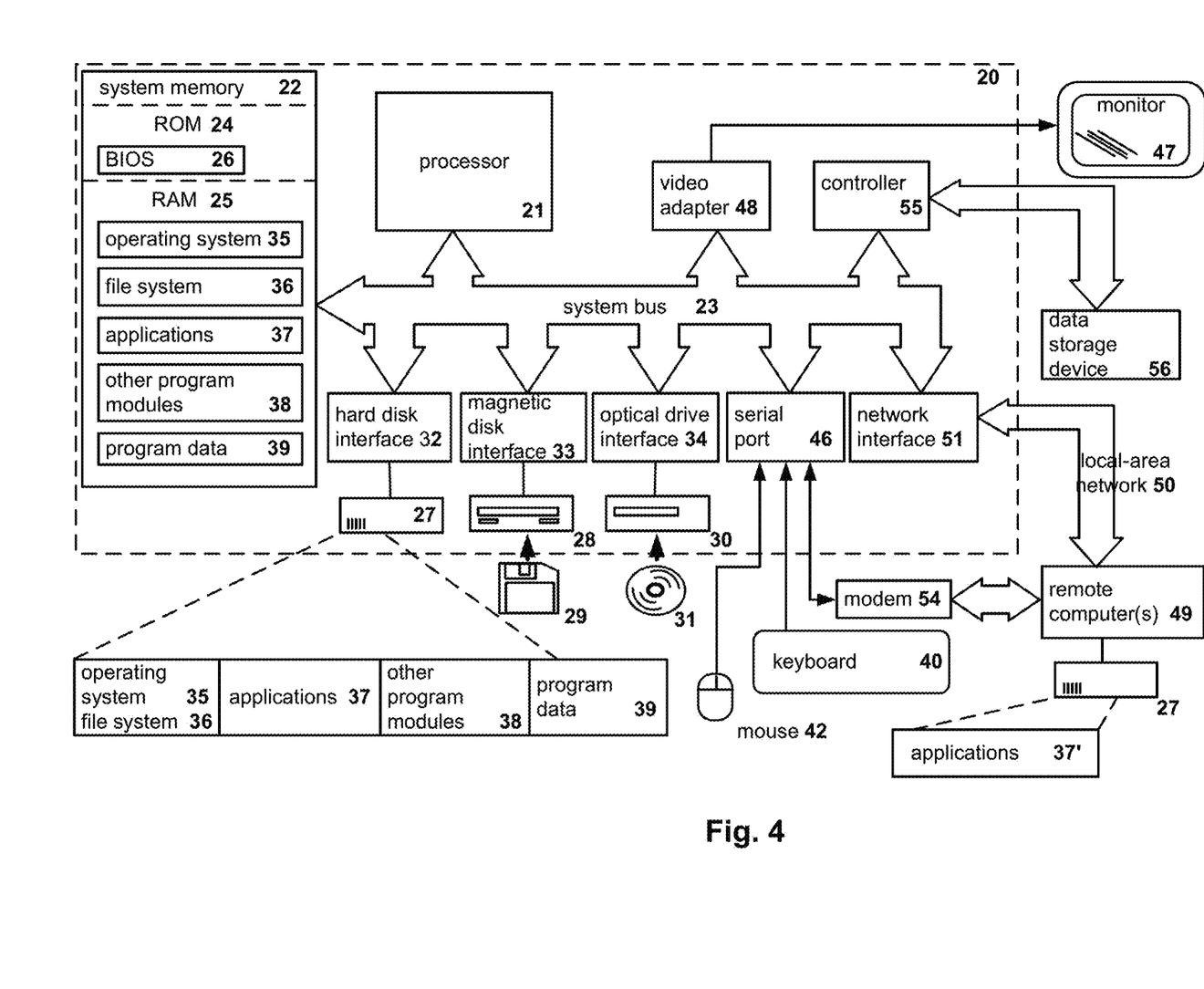
FIG. 4 shows an example of a general-purpose computer system on which the exemplary systems and methods for determining and forming a list of update agents can be implemented.

FIG. 4 is a diagram illustrating a general-purpose computer system on which aspects of systems and methods for determining and forming a list of update agents may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transforms the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for determining and forming a list of update agents for a plurality of network terminal nodes connecting with at least one server in a network the method comprising:
    receiving, by a processor of at least one network terminal node of the plurality of network terminal nodes, at least one unique identifier assigned by the at least one server to the at least one network terminal node;
    receiving, by the processor of the at least one network terminal node, a period of broadcasting assigned by the at least one server to the at least one network terminal node, wherein the period of broadcasting is directly related to a size of the network;
    broadcasting in the network the at least one unique identifier by the at least one network terminal node;
    collecting data relating to the at least one network terminal node and a plurality of other network terminal nodes broadcasting in a same broadcasting domain of the network, the collected data relating to the at least one network terminal node including an operating speed, a location in the network, and a purpose of use of the at least one network terminal node; and
    transmitting the collected data to the at least one server for (i) determining and forming a table of records for one or more broadcasting domains of the network and for (ii) determining and forming a list of update agents for the same broadcasting domain of the network, the server forming the table of records based at least in part on the collected data and forming the list based at least in part on the formed table and the collected data, wherein the table of records includes one or more records containing identifiers of one or more network terminal nodes that are located on the same network segment and that are visible to each other.

2. The computer-implemented method of claim 1, wherein the collecting comprises receiving a set of identifiers broadcast by the other network terminal nodes in the same broadcasting domain of the network.

3. The computer-implemented method of claim 1, wherein the data relating to the at least one network terminal node further comprises information relating to at least one of:
    an amount of free space on hard drives of the at least one network terminal node;
    a domain suffix of a name of the at least one network terminal node;
    a presence of vulnerabilities in software installed on the at least one network terminal node;
    a time period of uninterrupted operation of the at least one network terminal node;
    an account of a user using the at least one network terminal node; or
    a presence of a built-in battery in the at least one network terminal node.

4. A network terminal node in a network, comprising:
    at least one processor coupled to memory, the at least one processor being configured for:
        receiving at least one unique identifier assigned by the at least one server to the network terminal node which is one of a plurality of network terminal nodes connecting with the at least one server in the network;
        receiving a period of broadcasting assigned by the at least one server to the network terminal node, wherein the period of broadcasting is directly related to a size of the network;
        broadcasting in the network the at least one unique identifier;
        collecting data relating to the network terminal node and a plurality of other network terminal nodes broadcasting in a same broadcasting domain of the network, the collected data relating to the at least one network terminal node including an operating speed, a location in the network, and a purpose of use of the at least one network terminal node; and
        transmitting the collected data to the at least one server for (i) determining and forming a table of records for one or more broadcasting domains of the network and for (ii) determining and forming a list of update agents for the same broadcasting domain of the network, the server forming the table of records based at least in part on the collected data and forming the list based at least in part on the formed table and the collected data, wherein the table of records includes one or more records containing identifiers of one or more network terminal nodes that are located on the same network segment and that are visible to each other.

5. The network terminal node of claim 4, wherein the at least one processor is configured to collect the data by receiving a set of identifiers broadcast by the other network terminal nodes in the same broadcasting domain of the network.

6. The network terminal node of claim 4, wherein the data relating to the network terminal node further comprises information relating to at least one of:
an amount of free space on hard drives of the network terminal node;
a domain suffix of a name of the network terminal node;
a presence of vulnerabilities in software installed on the network terminal node;
a time period of uninterrupted operation of the network terminal node;
an account of a user using the network terminal node; or
a presence of a built-in battery in the network terminal node.

7. A non-transitory computer readable medium storing thereon computer executable instructions for determining and forming a list of update agents for a plurality of network terminal nodes connecting with at least one server in a network, including instructions for:
receiving, by a processor of at least one network terminal node of the plurality of network terminal nodes, at least one unique identifier assigned by the at least one server to the at least one network terminal node;
receiving a period of broadcasting assigned by the at least one server to the network terminal node, wherein the period of broadcasting is directly related to a size of the network;
broadcasting in the network the at least one unique identifier by the at least one network terminal node;
collecting data relating to the at least one network terminal node and a plurality of other network terminal nodes broadcasting in a same broadcasting domain of the network, the collected data relating to the at least one network terminal node including an operating speed, a location in the network, and a purpose of use of the at least one network terminal node; and
transmitting the collected data to the at least one server for (i) determining and forming a table of records for one or more broadcasting domains of the network and for (ii) determining and forming a list of update agents for the same broadcasting domain of the network, the server forming the table of records based at least in part on the collected data and forming the list based at least in part on the formed table and the collected data, wherein the table of records includes one or more records containing identifiers of one or more network terminal nodes that are located on the same network segment and that are visible to each other.

8. The non-transitory computer readable medium of claim 7, wherein the data relating to the at least one network terminal node further comprises information relating to at least one of:
an amount of free space on hard drives of the at least one network terminal node;
a domain suffix of a name of the at least one network terminal node;
a presence of vulnerabilities in software installed on the at least one network terminal node;
a time period of uninterrupted operation of the at least one network terminal node;
an account of a user using the at least one network terminal node; or
a presence of a built-in battery in the at least one network terminal node.

9. A computer-implemented method for determining and forming a list of update agents for a plurality of network terminal nodes connecting with at least one server in a network, the method comprising:
assigning, by a processor of the at least one server, at least one unique identifier to be broadcast by each of the plurality of network terminal nodes connecting with the at least one server in the network;
determining, for each of the plurality of network terminal nodes, a period of broadcasting of the at least one unique identifier in the network, wherein the period of broadcasting is directly related to a size of the network;
in response to receiving data relating to each of the plurality of network terminal nodes, determining and forming a table of records for one or more broadcasting domains of the network based at least in part on the received data, the received data relating to the at least one network terminal node including an operating speed, a location in the network, and a purpose of use of the at least one network terminal node; and
determining and forming a list of identifiers of update agents for each of the one or more broadcasting domains of the network based at least in part on the formed table and the received data, wherein the table of records includes one or more records containing identifiers of one or more network terminal nodes that are located on the same network segment and that are visible to each other.

10. The computer-implemented method of claim 9, further comprising:
transmitting the period of broadcasting to each of the plurality of network terminal nodes.

11. The computer-implemented method of claim 9, wherein the update agents comprise one or more network terminal nodes of each broadcasting domain whose identifier is contained in at least one record of the table, and which is designated for distribution of updates to other network terminal nodes within a same broadcasting domain.

12. The computer-implemented method of claim 9, further comprising transmitting the list of identifiers of update agents to each of the one or more broadcasting domains of the network.

13. A server in a network, comprising:
at least one processor coupled to memory, the at least one processor being configured for:
assigning at least one unique identifier to be broadcast by each of a plurality of network terminal nodes connecting with the server in the network;
determine, for each of the plurality of network terminal nodes, a period of broadcasting of the at least one unique identifier in the network, wherein the period of broadcasting is directly related to a size of the network
in response to receiving data relating to each of the plurality of network terminal nodes, determining and forming a table of records for one or more broadcasting domains of the network based at least in part on the received data, the received data relating to the at least one network terminal node including an operating speed, a location in the network, and a purpose of use of the at least one network terminal node; and
determining and forming a list of identifiers of update agents for each of the one or more broadcasting domains of the network based at least in part on the formed table and the received data, wherein the table of records includes one or more records containing identifiers of one or more network terminal nodes that are located on the same network segment and that are visible to each other.

14. The server of claim 13, wherein the at least one processor is further configured to:
transmit the period of broadcasting to each of the plurality of network terminal nodes.

15. The server of claim 13, wherein the update agents comprise one or more network terminal nodes of each broadcasting domain whose identifier is contained in at least one record of the table, and which is designated for distribution of updates to other network terminal nodes within a same broadcasting domain.

16. The server of claim 13, wherein the at least one processor is further configured to transmit the list of identifiers of update agents to each of the one or more broadcasting domains of the network.

17. A non-transitory computer readable medium storing thereon computer executable instructions for determining and forming a list of update agents for a plurality of network terminal nodes connecting with at least one server in a network, including instructions for:
assigning, by a processor of the at least one server, at least one unique identifier to be broadcast by each of the plurality of network terminal nodes connecting with the at least one server in the network;
determining, for each of the plurality of network terminal nodes, a period of broadcasting of the at least one unique identifier in the network, wherein the period of broadcasting is directly related to a size of the network;
in response to receiving data relating to each of the plurality of network terminal nodes, determining and forming a table of records for one or more broadcasting domains of the network based at least in part on the received data, the received data relating to the at least one network terminal node including an operating speed, a location in the network, and a purpose of use of the at least one network terminal node; and
determining and forming a list of identifiers of update agents for each of the one or more broadcasting domains of the network based at least in part on the formed table and the received data, wherein the table of records includes one or more records containing identifiers of one or more network terminal nodes that are located on the same network segment and that are visible to each other.

18. The non-transitory computer readable medium of claim 17, further comprising instructions for:
transmitting the period of broadcasting to each of the plurality of network terminal nodes.

* * * * *